United States Patent [19]

Hubbard et al.

[11] Patent Number: 4,969,457
[45] Date of Patent: Nov. 13, 1990

[54] BODY FLUIDS BARRIER MASK

[75] Inventors: Vance M. Hubbard; Welton K. Brunson; Darrell S. Caldwell, all of Bedford, Tex.

[73] Assignee: Tecnol, Inc., Forth Worth, Tex.

[21] Appl. No.: 415,044

[22] Filed: Sep. 29, 1989

Related U.S. Application Data

[62] Division of Ser. No. 104,807, Oct. 2, 1987.

[51] Int. Cl.$^5$ .................. A62B 7/10; A62B 17/00; A62B 18/00
[52] U.S. Cl. ..................... 128/206.12; 128/206.19; 128/206.13
[58] Field of Search ............... 128/206.12, 206.13, 128/206.14, 206.19, 206.21, 206.22, 863, 201.17, 206.15, 206.16, 206.17, 206.18; 2/206

[56] References Cited

U.S. PATENT DOCUMENTS

| | | | |
|---|---|---|---|
| 1,987,922 | 1/1935 | Blatt | 128/863 |
| 2,029,947 | 2/1936 | Schmitt et al. | 128/863 |
| 2,116,241 | 5/1938 | Heumann | 128/863 |
| 2,149,067 | 2/1939 | Otero | 128/206.16 |
| 2,916,037 | 12/1959 | Hansen | 128/284 |
| 3,170,461 | 2/1965 | Watts, Jr. | 128/863 |
| 3,288,138 | 11/1966 | Sachs | 128/863 |
| 3,490,447 | 1/1970 | Jackson | 128/863 |
| 3,603,315 | 9/1971 | Becker | 128/146.2 |
| 3,613,678 | 10/1971 | Mayhew | 128/146.2 |
| 3,884,227 | 5/1975 | Lutz et al. | 128/146.2 |
| 3,888,246 | 6/1975 | Lauer | 128/201.17 |
| 3,929,135 | 12/1975 | Thompson | 128/287 |
| 3,989,867 | 11/1976 | Sisson | 428/132 |
| 4,215,682 | 8/1980 | Kubik et al. | 128/205 |
| 4,323,063 | 4/1982 | Fisichella | 128/206.12 |
| 4,419,993 | 12/1983 | Petersen | 128/206.19 |
| 4,510,931 | 4/1985 | Henderson et al. | 128/202 |
| 4,600,002 | 7/1986 | Maryyanek et al. | 128/206.19 |
| 4,635,628 | 1/1987 | Hubbard et al. | 128/201.17 |
| 4,662,005 | 5/1987 | Grier-Idris | 128/206 |
| 4,684,570 | 8/1987 | Malaney | 408/296 |

OTHER PUBLICATIONS

"The Condensed Chemical Dictionary", ©1961, pub. by Reinhold Publishing Corp., N.Y., Sixth Ed., pp. 826, 827, 910-911.

Primary Examiner—Edgar S. Burr
Assistant Examiner—Kimberly L. Asher
Attorney, Agent, or Firm—Baker & Botts

[57] ABSTRACT

A face mask (10) is provided for covering the mouth and nose of a wearer (14). The mask (10) prevents the passage of liquid from external to the mask to the face of the wearer (14). The mask (10) has four layers including a special low density polyethylene barrier (26). The barrier (26) prevents the passage of liquid in at least one direction while freely allowing the passage of gases in both directions.

3 Claims, 1 Drawing Sheet

BODY FLUIDS BARRIER MASK

--RELATED APPLICATION

This is a divisional application of pending application Ser. No. 07/104,807, filed Oct. 2, 1987 and entitled "Body Fluids Barrier Masks".

TECHNICAL FIELD OF THE INVENTION

This invention relates in general to medical equipment, and in particular to a face mask which restricts the passage of liquids exterior the mask to the face of the wearer.

BACKGROUND OF INVENTION

The wearing of a face mask has become standard procedure in many health care activities. The use of face masks is important, for example, to lab technicians during the conduction of tests, to nurses in the care of contagious patients, to physicians during surgery, and to dentists during their work in a patient's mouth.

Presently developed face masks filter out germs and particles, but are not impervious to liquids. Lab technicians, for example, conduct many tests with samples of possibly contagious "body fluids" i.e. liquids which include blood, urine and saliva. During these tests, such as using a centrifuge to separate a sample, it is possible that some of the sample may be splashed, sprayed or thrown into the face of the technician. Due to the potential force of the splashing, a portion of the liquid sample may penetrate currently available protective masks. This problem of the mask being pervious to liquids is similar to what can be expected by physicians, nurses and dentists.

With the rapid increase in the spread of AIDS, the use of protective equipment, including masks, has become even more important. The Center for Disease Control in Atlanta, Georgia has found that AIDS can be passed by contact of body fluids. The contact of AIDS contaminated body fluids with another person's source of body fluids, ie. eyes, nose, mouth, etc., can pass the disease. It is, therefore, necessary to prevent these body fluids from contacting the eyes, nose and mouth of an attendant.

Currently available disposable masks do not prevent the passage of liquids external the mask to the face of the wearer. Thus, a need has arisen for a disposable mask that will allow the passage of gases, yet prevent the passage of liquids in order to protect the wearer.

SUMMARY OF THE INVENTION

The present invention disclosed and claimed herein describes a method and apparatus for a disposable face mask which will prevent the passage of liquids which substantially eliminates problems associated with prior disposable masks. The present invention allows breathability through the mask while preventing the penetration of liquids from outside the mask.

In one aspect of the present invention, the mask is dimensioned to be worn over the face to cover the nose and mouth of the wearer. The mask is pervious to gases, yet substantially impervious to the passage of body fluids from external of the mask. This will allow the wearer to breathe freely through the mask, while preventing body fluids from passing through the mask and contacting the face of the wearer.

In the preferred embodiment, the present mask has four layers of material. The outermost layer is a treated cover stock which serves as a partial barrier to liquids. The second layer is a filtration media which serves as a filter to prevent the passage of airborne bacteria and as a pad to absorb liquid. The third layer is a liquid barrier, and the fourth layer is a facing piece made of a nonwoven fabric for contact with the face of the wearer. The fourth layer is designed to prevent loose fiber beads of perspiration or facial hair from contacting the barrier layer.

It is a technical advantage of the present invention that the mask will prevent the passage of liquids from exterior the mask while allowing breathability. Thus, the mask may be worn comfortably during conditions in which the wearer may be exposed to liquids which might infect the wearer.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE INVENTION

Figure 1:
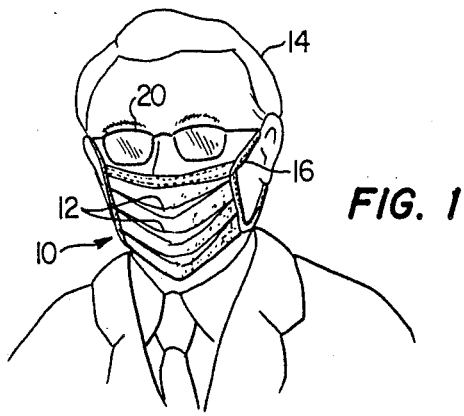
FIG. 1 is a perspective view of the face mask according to one embodiment of the invention as it appears when worn over the nose and mouth of a person.

Referring to FIG. 1, the body fluids barrier mask of the present invention is generally identified by the reference numeral 10. In the embodiment shown, the mask 10 has a plurality of pleats 12 for expansion over and around the mouth and nose of a person 14. Although not shown, it is to be understood that the mask 10 could have nay number of folds, or may have no folds. The mask 10 is removably attached to the person 14 by elastic loops 16 (only one shown). The securing ties 16 and 18 can be tied to matching pieces (not shown) on the opposite end of the It is to be understood that any other appropriate securing devices such as, for example, the strips could be used. The person 14 may also desire to wear some type of eye protection such as eye glasses 20.

Figure 2:
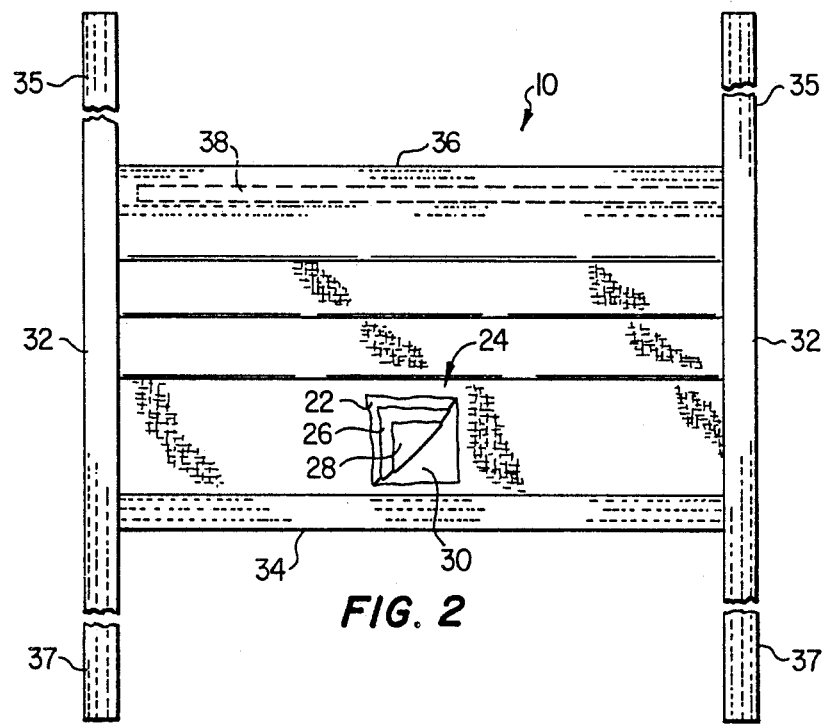
FIG. 2 is an elevational view of the face mask interior side out with a cutaway showing the layers of the mask in accordance with the preferred embodiment.

Referring to FIG. 2, the face mask 10 in accordance with the preferred embodiment, can be seen in more detail. The face mask 10 is shown with its internal face 22 on top. The face mask 10 is fabricated in general as described in U.S. Pat. No. 4,635,628, Jan. 13, 1987, to Hubbard et al. and assigned to Tecnol, Inc., which is incorporated herein by reference.

The face mask 10, as shown by the cutaway portion at flap 24, has four layers of material. The bottom layer is the internal face 22. The internal face 22 is constructed of a lightweight, highly porous, softened, nonirritating, nonwoven, nonwicking fabric, such as, for example, Dexter, Inc. product number 3768. As used herein, a nonwicking material is defined as a material which will not draw liquid nor allow liquids to be drawn therethrough. The internal face 22 is designed to prevent unwanted wicking particles such as facial hair, loose fibers or beads of perspiration from contacting the next outermost layer which could cause a wicking effect to draw liquids through the next outermost layer. The internal face 22 also provides a comfortable surface for contact with the wearer.

The next outermost layer is a barrier material 26 which is of primary importance to the present invention. The barrier material 26 is a liquid barrier and may be, for example, Visqueen Film Products' low density polyethylene Vispore X-6212. Barrier materials, such as material 26, differentiate between gases and liquids. These nonwetting materials have small apertures which prevent liquids from passing through the apertures due to the liquid's relatively high surface tension. In the present invention, it is preferable to have the apertures as large as possible to make breathing easy, and yet small enough to retard the flow of liquids. The barrier material 26 is designed to freely pass gases in either direction, while restricting passage of liquids in at least one direction. The mask 10 is constructed with the barrier material 26 placed to restrict liquid passage from exterior the mask 10. Further description of the construction and operation of such a barrier material may be found in U.S. Pat. No. 3,929,135, Dec. 30, 1975, to Thompson, assigned to the Procter & Gamble Company, which is incorporated herein by reference. A low density polyethylene as defined in the Condensed Chemical Dictionary, 10th Edition, Van Nostrand Rheinhold Company, Publisher, is a polyethylene $(H_2C:CH_2)_x$ having highly branched and widely spaced chains. The low density polyethylene has a specific gravity of about 0.915; crystality 50–60%; melting point 240° F.; tensile strength 1500 psi; impact strength over 10 foot-pounds/inch/notch; thermal expansion $17 \times 10^{-5}$ inches/inch/°C.; soluble in organic solvents above 200° F.; and insoluble at room temperature. Low density polyethylenes are generally derived from ethylene polymerized in a free-radical initiated liquid phase reaction at 1500 atmospheres and 375° F. with oxygen as a catalyst. A second method uses pressures of only 100 to 300 psi at a temperature of less than 212° F. with an undisclosed catalyst in a vapor-phase reaction.

The next outermost layer is a filtration media 28 which is, for example, melt blown polypropylene or polyester. The filtration media 28 prevents the passage of airborne bacteria in either direction. This will prevent the passage of germs to and from the wearer of the mask 10. The next and outermost layer is a treated cover stock 30. The cover stock 30 is, for example, a nonwoven material such as cellulose fiber. The cover stock 30 is preferably chemically coated or treated by a process which is well known in the art to render the stock 30 nonwettable by body liquids.

If no appreciable pressure is applied to the liquid, such as from splashing or throwing the liquid, a simple barrier, such as barrier 26, may readily oppose the passage of the liquid. Unfortunately, the fluid dynamics of splashed, sprayed or thrown liquids tend to create relatively high local pressures and penetration of the barrier 26 can occur. The high pressure at the barrier 26 can be prevented by an outer cover which serves to reduce the velocity of the liquid before it encounters the barrier 26. The cover stock 30 and the filtration media 28 also serve as an aid to the barrier material 26 by slowing down any liquid that may be splashed, sprayed or thrown at the mask. By requiring the liquid to pass through these two layers prior to reaching the barrier material 26, the liquid will have less pressure and the barrier material 26 will be better able to prevent passage of the liquid.

In an alternate embodiment, the passage of liquids may be retarded mainly by an exterior barrier such as cover 30. In this embodiment, the barrier material 26 is eliminated to improve breathability. When utilizing this embodiment some liquid may pass through the mask to the face of the wearer over a period of time, therefore, if the liquid is hazardous, the mask must be monitored closely.

The mask 10 can be provided with heat or ultrasonically sealed edges 32, 34 and 36. The attaching devices, tie strips 35 and 37, may be integral with the sealed edges 32. The edge 36 may have an included stiffening device 38 to allow molding of the mask 10 around the wearer's nose and, thus, provide a better fit. Although not shown, the attaching devices may be a frame incorporating an eye shield fitted to the face of the wearer in which the mask 10 is an insert.

Figure 3:
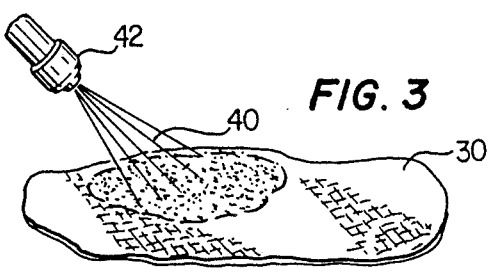
FIG. 3 is a partial perspective view of the application of a chemical to the cover stock in accordance with the present invention.

FIG. 3 shows a cross-section of cover stock 30 as fixed to filtration media 28. As previously described, cover stock 30 is coated or treated with a chemical 40 to render it nonwettable by body liquids.

EXAMPLE

A test of the preferred embodiment of the present invention and competitive masks was conducted under the following conditions:

Whole human blood was placed in a commercially available plastic pump type bottle with an adjustable nozzle. A mannequin head was draped with an absorbant white material for ease of detecting the presence of blood. One of the masks being tested was placed over the white material and tied over the face of the mannequin head. The pump bottle nozzle was set on stream and placed 1½ 2 feet from the mannequin. Four pumps from the bottle were applied to each mask in the nose and mouth area. After two minutes the mask was checked and the results recorded. A failure was indicated by the presence of blood on the white material or on the inner facing of the mask, thus indicating passage of blood through the mask to the face of the wearer.

Five different commercially available face masks and five samples of the preferred embodiment of the present invention were tested under these conditions. In every case, the masks constructed per the present invention successfully prevented the passage of blood, while each of the competitive face masks failed. These tests clearly show a technical advantage of the present invention which is the ability to prevent the passage of body fluids through a mask. Thus, a lab technician, a physician, a nurse or a dentist will be able to wear a mask and work without fear of contracting highly contagious diseases, such as AIDS, by the contact of body fluids through a face mask.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of making a face mask impervious to body liquids, comprising the steps of:
    dimensioning a mask portion to cover the nose and mouth of a wearer;

forming said mask portion of layers of material at least one of which is a barrier layer pervious to gases yet impervious to body liquids said barrier layer formed of perforated low density polyethylene having the perforations sized to permit gas flow and to prevent the flow of body liquids therethrough;

placing a layer of chemically coated cover stock over one side of said barrier layer; and connecting attachment means to said mask portion providing removable attachment of the mask to the face of the wearer.

2. The method of claim 1 and also including the step of placing an internal face layer of non-wicking material to cover one side of said barrier layer.

3. The method of claim 2 and also including the step of: placing a layer of filtration media between said layer of cover stock and said barrier layer.

* * * * *

UNITED STATES PATENT AND TRADEMARK OFFICE
CERTIFICATE OF CORRECTION

PATENT NO. : 4,969,457
DATED : November 13, 1990
INVENTOR(S) : Hubbard et al.

It is certified that error appears in the above-identified patent and that said Letters Patent is hereby corrected as shown below:

Column 2, line 42, change "nay" to --any--.

Column 2, lines 44-46, delete "The securing ties 16 and 18 can be tied to matching pieces (not shown) on the opposite end of the".

Signed and Sealed this

Seventh Day of April, 1992

Attest:

HARRY F. MANBECK, JR.

*Attesting Officer*  *Commissioner of Patents and Trademarks*